Nov. 25, 1941.　　　L. W. STETTNER　　　2,263,655

PIPE COUPLING

Filed Jan. 10, 1939

INVENTOR.
LUDWIG W. STETTNER
BY
ATTORNEY.

Patented Nov. 25, 1941

2,263,655

UNITED STATES PATENT OFFICE 2,263,655

PIPE COUPLING

Ludwig W. Stettner, Piedmont, Calif., assignor to Victor Equipment Co., San Francisco, Calif., a corporation of Delaware Application January 10, 1939, Serial No. 250,159

4 Claims. (Cl. 285—123)

This invention relates to pipe couplings or joints and has particular reference to such joints as used to connect the gas passages of welding and cutting torches with the sources of gas, though it is useful in couplings for other purposes.

The object of the invention is to provide improvements in couplings of this kind which will hold the coupling nut in operating position when the joint is broken, yet provide for bodily displacement of the coupling nut when desired. Other features and advantages of the invention will appear in the following description and accompanying drawing.

Figure 1:
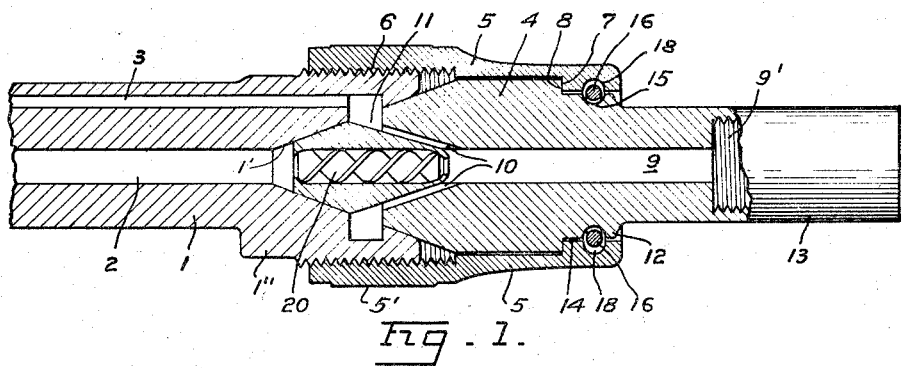
Figure 1 is a central longitudinal cross section of my improved coupling.

The coupling here chosen to illustrate the invention is at the joint between a gas welding torch and a source of supply of a fuel gas and a combustion supporting gas under pressure, such as acetylene and oxygen. In the drawing 1 is the female portion of the coupling joint provided with passages 2 and 3 for the separate gases and formed with a conical seat 1' into which the complementarily formed portion 4' seats and is drawn tightly in place by means of a sleeve or coupling nut 5 threaded over an enlarged portion 1" of member 1 as at 6, and formed with an inwardly extending square shoulder 7 engaging a reversely formed similar shoulder 8 on member 4.

Member 4 is provided with a bore 9 fitted with a spiral fin 20 and registering with passage 2, and also has several small passages 10 leading from an annular step or groove 11 formed in member 4, angularly into bore 9 so as to receive gas from passage 3 and direct it into bore 9 to mix with the gas from passage 2 for flowing to the shank 17 of the torch which usually screws into the threaded end 9' of bore 9, though may be made integral with member 4 if desired.

Member 4 is reduced in diameter to form shoulder 8 and is again reduced in diameter to form a slanted shoulder or ridge 12 and a cylindrical shank 13. Shoulder 12 is spaced from shoulder 8 to provide a cylindrical surface 14 and in which is formed a groove 15 to receive a split spring wire ring 16 which also projects into a groove 18 formed in the bore of member 5 as shown in Figure 1.

Nut 5 is provided with the usual wrench faces indicated at 5', and grooves 15 and 18 are in aligned relation when shoulders 7 and 8 are in contact with nut 5 screwed up tight.

Figure 2:
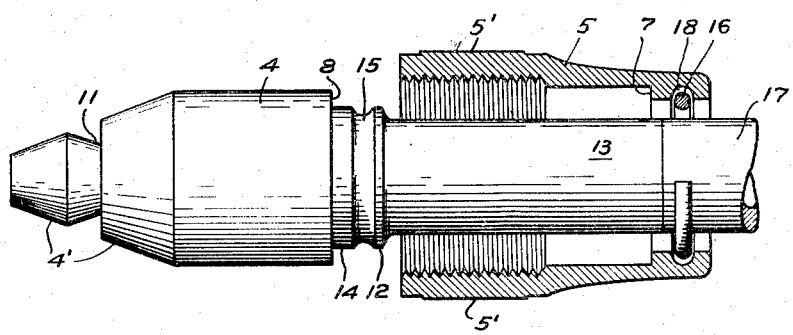
Figure 2 is a side view of the male end of the coupling with nut shown retracted and with the latter element shown in section as well as showing the spring retaining ring partly in section.
Figure 3:
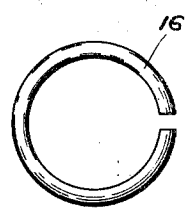
Figure 3 is a plan view of the spring split ring or retaining ring for holding the nut in operative position.

The internal diameters of nut 5 are slightly larger than the external diameters of member 4 as indicated in the drawing so as to be freely revolvable thereover in screwing the coupling together. The inner diameter or bottom of groove 15 is slightly greater than the diameter of shank 13 and the diameter of the spring wire split ring 16 is preferably such as to lightly embrace or just clear the bottom of groove 15 and be entirely free in groove 18, so that nut 5 will be perfectly free for revolving on member 4 yet be retained in coupling position by the ring. However, by reason of annular shoulder or ridge 12 being slanted on both sides it is manifest that when the nut is unscrewed so as to back out member 1 or member 4 depending on whichever is able to be moved longitudinally, then by forcibly pushing nut 5 to the right with respect to member 4 the spring split ring will expand and ride up the inclined inner wall of ridge 12 so as to permit the nut being pushed over to the position shown in Figure 2, and in which position the ring is retained in the outer groove 18 entirely free on shank 13. The outer side of ridge 12 being slanted also, permits the nut to be forcibly pushed back in place with ring in both grooves, or upon engaging the threaded portions of the coupling and screwing up the joint the ring will automatically be pulled into position.

By the construction shown the nut is normally held in place before coupling the joint, yet may be forcibly removed if desired, and as readily replaced. The action of the split ring is due to its diameter in relation to the diameter of the confronting grooves, slanted walls of ridge 12, and sharp inner edges of groove 18, so that the ring always expands into the outer groove when the nut is forcibly pushed along, though it will be evident that the relative formation of the two grooves may be directly reversed so as to force the ring into the inner groove if desired, and which will accomplish the same result.

I am aware of wire split rings being used to retain various parts in place, but do not know of any arrangement operating in the manner of my invention above described.

Having thus described my invention what I claim is:

1. In a coupling joint of the class described having a pair of conforming coupling members, one of said coupling members having an external threaded portion, the other of said coupling members having a head terminating with an abrupt shoulder, a reduced cylindrical portion inward of the abrupt shoulder and a further reduced cylindrical shank inward of the reduced cylindrical portion, and a coupling nut slidably mounted on the second mentioned coupling member and having at one end an inwardly extending shoulder for engagement with the abrupt shoulder on said second mentioned coupling member, the opposite end of said nut being internally threaded for engagement with the external threads on the first mentioned coupling member for drawing the coupling members together when the nut is turned.

2. In a coupling joint of the class described having a pair of conforming coupling members, one of said coupling members having an external threaded portion, the other of said coupling members having a head terminating with an abrupt shoulder, a reduced cylindrical portion inward of the abrupt shoulder and a further reduced cylindrical shank inward of the reduced cylindrical portion, a coupling nut slidably mounted on the second mentioned coupling member and having at one end an inwardly extending shoulder for engagement with the abrupt shoulder on said second mentioned coupling member, the opposite end of said nut being internally threaded for engagement with the external threads on the first mentioned coupling member for drawing the coupling members together when the nut is turned, a pair of confronting grooves around the inside of the shouldered portion of the nut and the outside circumference of the reduced cylindrical portion, and a split spring wire ring within the confronting grooves, one only of said grooves being deep enough to receive the ring to clear the edge of the other groove when the nut is forced longitudinally of the coupling members.

3. In a coupling joint as set forth in claim 2 wherein said edge of the groove is beveled on both sides to induce the split ring to override it.

4. In a coupling joint as set forth in claim 2 wherein the groove in the nut is of sufficient depth to receive the ring.

LUDWIG W. STETTNER.